United States Patent [19]

Jeong et al.

[11] Patent Number: 5,799,122

[45] Date of Patent: Aug. 25, 1998

[54] MULTIFIBER OPTICAL CONNECTOR

[75] Inventors: Myung-Yung Jeong; Sang-Ho Park; Oh-Gone Chun; Seung-Ho Ahn; Tae-Goo Choy, all of Daejeon; Hak-Seok Kim, Kyungsangbuk-Do, all of Rep. of Korea

[73] Assignees: Electronics and Telecommunications Research Institute, Daejeon; Korea Telecommunication Authority, Seoul, both of Rep. of Korea

[21] Appl. No.: 746,978

[22] Filed: Nov. 19, 1996

[30] Foreign Application Priority Data

Aug. 27, 1996 [KR] Rep. of Korea .................. 96-35750

[51] Int. Cl.$^6$ ........................................ G02B 6/38
[52] U.S. Cl. .......................... 385/59; 385/63; 385/60
[58] Field of Search ...................... 385/60, 54, 55, 385/56, 59, 63, 65, 89, 83

[56] References Cited

U.S. PATENT DOCUMENTS

| | | | |
|---|---|---|---|
| 4,818,058 | 4/1989 | Bonanni | 350/96.2 |
| 5,121,454 | 6/1992 | Iwano et al. | 385/59 |
| 5,214,730 | 5/1993 | Nagasawa et al. | 385/59 |
| 5,222,168 | 6/1993 | Saito et al. | 385/59 |
| 5,317,663 | 5/1994 | Beard et al. | 385/70 |
| 5,600,747 | 2/1997 | Yamakawa et al. | 385/59 |

FOREIGN PATENT DOCUMENTS 8501118  3/1985  WIPO .

OTHER PUBLICATIONS

Low-Reflection, Single-Mode Multifiber Array Connector (MAC); K.Y. Lee and W.J. Parzygnat; 1989; pp. 362–364.
Compact and Self-Retentive Multi-Ferrule Optical Backpanel Connector; Shinichi Iwano, Ryo Nagase, Kazunori Kanayama, Etsuji Sugita, Keiichi Yasuda and Yasuhiro Ando; 1992; pp. 1356–1362.
Design and Performance of a Multifiber Backpanel Type Connector; Masaaki Takaya, Mitsuru Kihara and Shinji Nagasawa; 1996; pp. 655–657.

*Primary Examiner*—John Ngo
*Attorney, Agent, or Firm*—Antonelli, Terry, Stout & Kraus, LLP

[57] ABSTRACT

An improved multifiber optical connector is disclosed which concurrently transmits an optical signal and provides for optical signal transmission with a lower transmission loss. The connector includes an adapter including openings into which a plug is inserted, a pass through hole formed in a central portion of the multifiber optical connector, and engaging holes formed in portions of the multifiber optical connector, a plug, which engages the openings of the adapter, including a through hole, into which optical fibers are inserted, formed in a central portion of the plug, an engaging portion having an engaging jaw portion for connecting the plug to the adapter and formed at one end of the plug, a plug housing for receiving a body of the plug, a ferrule, which is disposed in one end of the plug, having a plurality of holes into which a core of the optical fibers are inserted to provide protection and alignment, an optical fiber alignment device inserted into the pass through hole of the adapter, for surrounding an outer portion of the ferrule disposed at one end of the plug inserted into the adapter and for aligning the optical fiber inserted into the ferrule, and an optical cable protector surrounding an outer portion of the optical cable connected for protecting against breakage of the optical cable.

8 Claims, 3 Drawing Sheets

MULTIFIBER OPTICAL CONNECTOR

BACKGROUND OF THE INVENTION

1. Field of the Invention

The present invention relates to a multifiber optical connector, and particularly, to an improved multifiber optical connector which is capable of concurrently transmitting an optical signal with a lower transmission loss by providing a multifiber optical connector of a ribbon type optical cable which requires repeated connection and separation when setting-up an optical cable system.

2. Description of the Conventional Art

As technology advances, humans require more information. Therefore, light-related techniques have been intensively studied for transmitting a large rate of information. A communication system having a large capacity and high speed signal transmission capability is required for rapidly advancing multimedia techniques such as an audio and video signal transmission and motion picture signal processing. Therefore, in the industry, the use of an optical cable, which is an important signal transmission medium, has changed from a single fiber optical cable to a multifiber optical cable.

Generally, in an optical cable system, a disconnected section exists due to its connection limit. This disconnected section should be connected. The connection of the optical fiber should be performed so that an insertion loss and reflection loss can be minimized.

As a connection means for the optical cable system, an optical connector is conventionally used for a permanent connection or a repeated detachable connection. Among these connectors, a multifiber optical connector is widely used in the industry due to its better flexible characteristic and shorter connection time; however, its insertion loss characteristic is worse than a common multifiber optical connection member.

Among the methods for implementing a multifiber optical connector technique, there are several methods as follows: a method of duplicating a single fiber by using a cylindrical structure made of a ceramic and a cylindrical sleeve, a method forming a V-shaped groove on a ceramic substrate and connecting an aligned sleeve, and a method for aligning and connecting an optical fiber array by using an accurately processed cylindrical metallic rod. Here, in accordance with an application field, the connection method differs. Recently, a cross-sectional inclined polishing method is used in order to provide an excellent loss characteristic.

Among the above-described optical cable connection methods, a miniature unit (MU) type back panel connector introduced in Japan is directed to reducing the size of a single fiber ceramic ferrule in half. Since this connector does not use an optical fiber array, it is very easy to maintain a cable system. However, since such a connector has a lower mounting density, it will not be adaptable to the compact size of products in the future and to fabricate a high density product. In addition, since a more accurate fabrication technique is required due to an alignment technique directed to using a sleeve, the fabrication price of the connector may become costly.

A multifiber array connector (MAC) was introduced in the U.S.A. This technique is directed to etching a ceramic substrate to have a V-shaped groove, for thus increasing mounting density and obtaining a multifiber characteristic; however, it is difficult to process pitch and height necessary to achieve an accuracy below 1 µm which is required for the optical connector, whereby the fabrication of the product is costly.

In addition, there is still another method. The connector is fabricated by a mechanically transferable method. This method is classified into an MTP type and an MPO type based on its applicable field. The above-described connector has been most widely used in the world with its lower insertion loss of about 0.2 dB. In the above-described multifiber optical connector, the ferrule fabrication technique is most important for alignment. Therefore, a glass reinforced resin is used so as to decrease the coefficient of the thermal expansion to $2 \times 10^5$. In addition, as a molding method, a low pressure transfer molding method is used. For an alignment, two guide pins are used, and a clamp spring is used for maintaining a coupling force. The above-described connectors have an advantage in the aspect of the productivity because of using a high molecular molding material; however, a new material for the connector must have a characteristic of improving connection safety based on the variation of temperature. In order to improve the insertion loss problem, a high accuracy technique is needed. In addition, alignment error is increased during inclined polishing due to an interval between alignment of the metal rod and a ferrule which is a high molecular molding material.

SUMMARY OF THE INVENTION

Accordingly, it is an object of the present invention to provide an improved multifiber optical connector which overcomes the problems encountered with conventional multifiber optical connectors.

It is another object of the present invention to provide an improved multifiber optical connector which is capable of concurrently transmitting an optical signal and providing disconnection of an optical signal transmission with a lower transmission loss by providing a multifiber optical connector of a ribbon type optical cable wherein an optical cable requires a repeated connection and separation when setting-up an optical cable system.

To achieve the above objects, there is provided an improved multifiber optical connector which includes an adapter including openings into which a plug is inserted, a pass through hole formed in the central portion of the multifiber optical connector, and an engaging hole formed in the upper and lower entire portion of the multifiber optical connector, a plug, which engages both openings of the adapter, including a through hole, into which optical fibers are inserted, formed in the central portion thereof, an engaging portion having an engaging jaw portion in order to engage the plug to the adapter and formed at one end thereof, a plug housing for receiving a plug body, a ferrule, which is disposed in one end of the plug, having a plurality of small holes into which a core of the optical fibers are inserted for optical fiber protection and alignment functions, an optical fiber alignment unit, which is inserted into the pass through hole of the adapter, for surrounding the outer portion of the ferrule disposed at one end of the plug inserted into the adapter and for accurately aligning the optical fiber inserted into the ferrule, and an optical cable protection unit disposed for surrounding the outer portion of the optical cable connected to the plug and for protecting a breakage of the optical cable.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

5,799,122

3

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
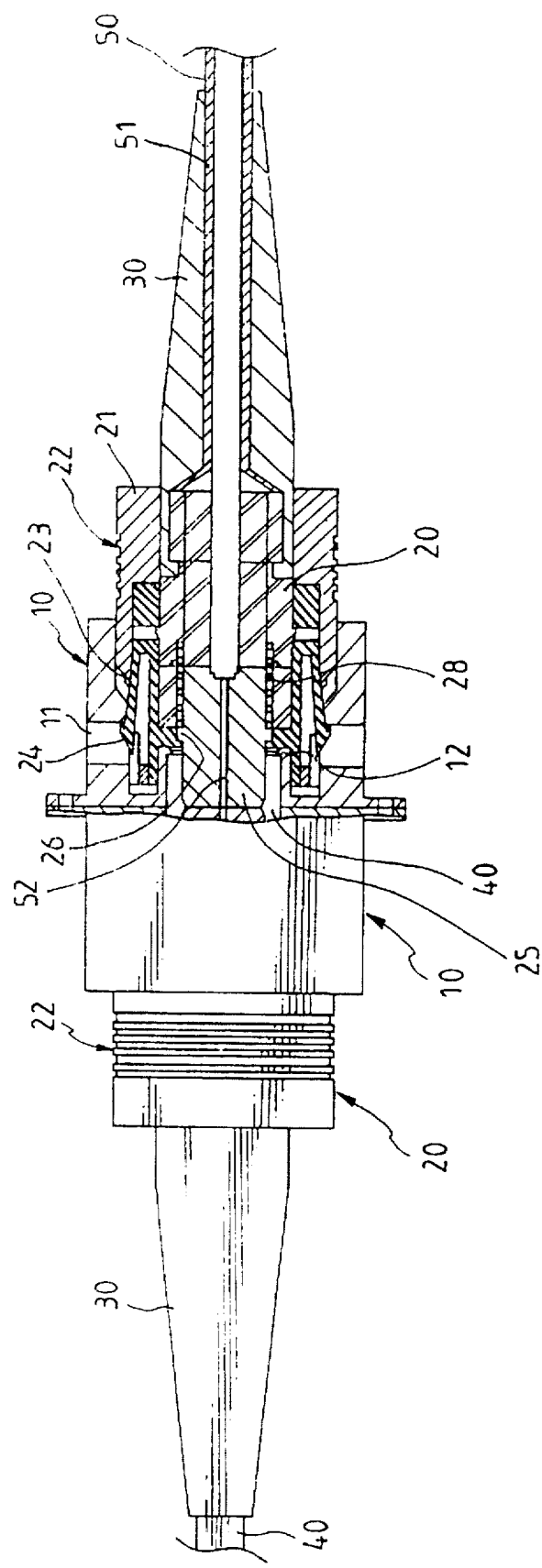
FIG. 1 is a partially cut-away cross-sectional view illustrating a multifiber optical connector according to the present invention.
Figure 2:
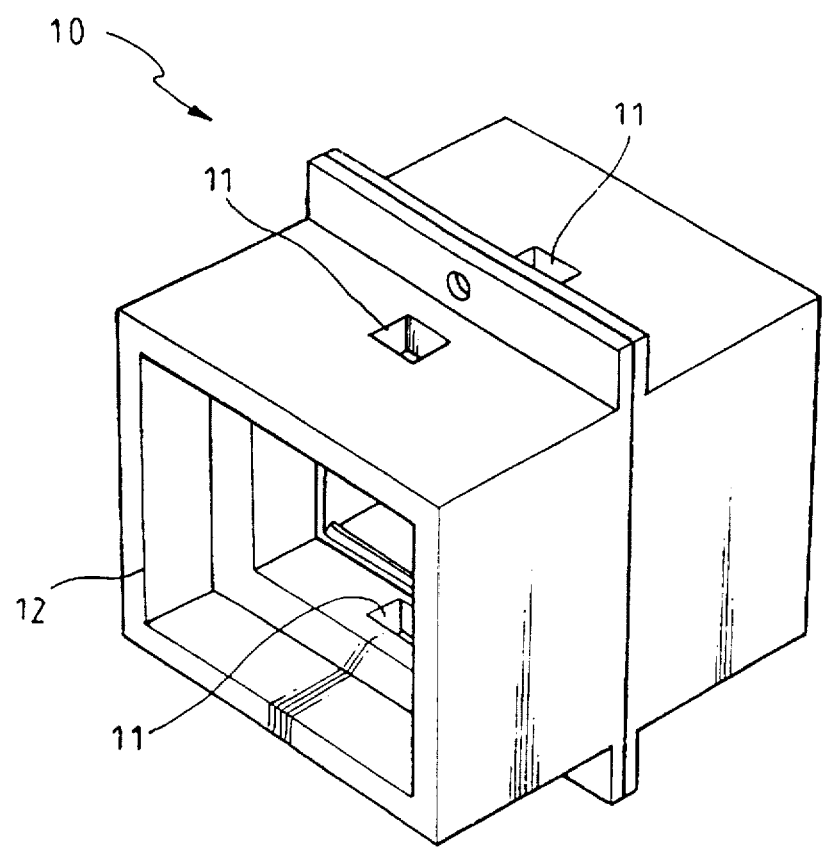
FIG. 2 is a perspective view illustrating an adapter of a multifiber optical connector as shown in FIG. 1 according to the present invention.

FIG. 1 is a partially cut-away cross-sectional view illustrating a multifiber optical connector according to the present invention, and FIG. 2 is a perspective view illustrating an adapter of a multifiber optical connector as shown in FIG. 1 according to the present invention.

As shown therein, the multifiber optical connector according to the present invention includes an adapter 10 including openings 12 into which a plug 20 is inserted, a pass through hole formed in the central portion of the multifiber optical connector, and an engaging hole 11 formed in the upper and lower entire portion of the multifiber optical connector, a plug 20, which engages both openings of the adapter 10, including a through hole, into which optical fibers are inserted, formed in the central portion thereof, an engaging portion 23 having an engaging jaw portion 24 in order to engage the plug 20 to the adapter 10 and formed at one end thereof, a plug housing 21 for receiving a plug body, a ferrule 25, which is disposed in one end of the plug 20, having a plurality of small holes into which a core of the optical fibers are inserted for optical fiber protection and alignment functions, an optical fiber alignment unit, which is inserted into the pass through hole of the adapter, for surrounding the outer portion of the ferrule disposed at one end of the plug inserted into the adapter and for accurately aligning the optical fiber inserted into the ferrule, and an optical cable protection unit 30 disposed for surrounding the outer portion of the optical cable 50 connected to the plug 20 and for protecting against breakage of the optical cable.

Generally, since the optical cable 50 is breakable, it is coated with a flexible material. When the optical cable is not uncoated for a more accurate alignment connection, it is very difficult to handle. In addition, since the optical cable 50 to which the plug 20 is attached is breakable due to the bending force applied thereto when deforming the same, an optical cable protection member 30 made of a rubber or the like having a good flexibility is used so as to prevent the optical cable from being broken.

Ferrule 25 is attached to one end of the plug 20 to provide a good protection function and alignment function.

In addition, a sleeve 40 is an optical fiber alignment member for supporting the outer circumferential portion of the ferrule 25 disposed at a portion of the plug 20 inserted in the adapter 10 and aligns the optical fiber core 52 inserted into the ferrule 25 which is inserted in the central hole of the adapter 10.

4

An engaging portion 24 of the plug 20 is formed in the engaging hole 11 formed in the adapter 10 when engaging with the plug 20. This construction provides alignment when engaging with the plug 20, and provides safety with respect to the externally applied force after it is engaged with the plug 20.

A sleeve fixing protrusion prevents the sleeve 40, which is inserted into the central pass through hole of the adapter, from escaping therefrom. A protruded portion is formed on the outer circumferential surface of a plug housing 21 of the plug 20. An outer coating member is disposed on the ribbon type optical cable 50.

Figure 3A:
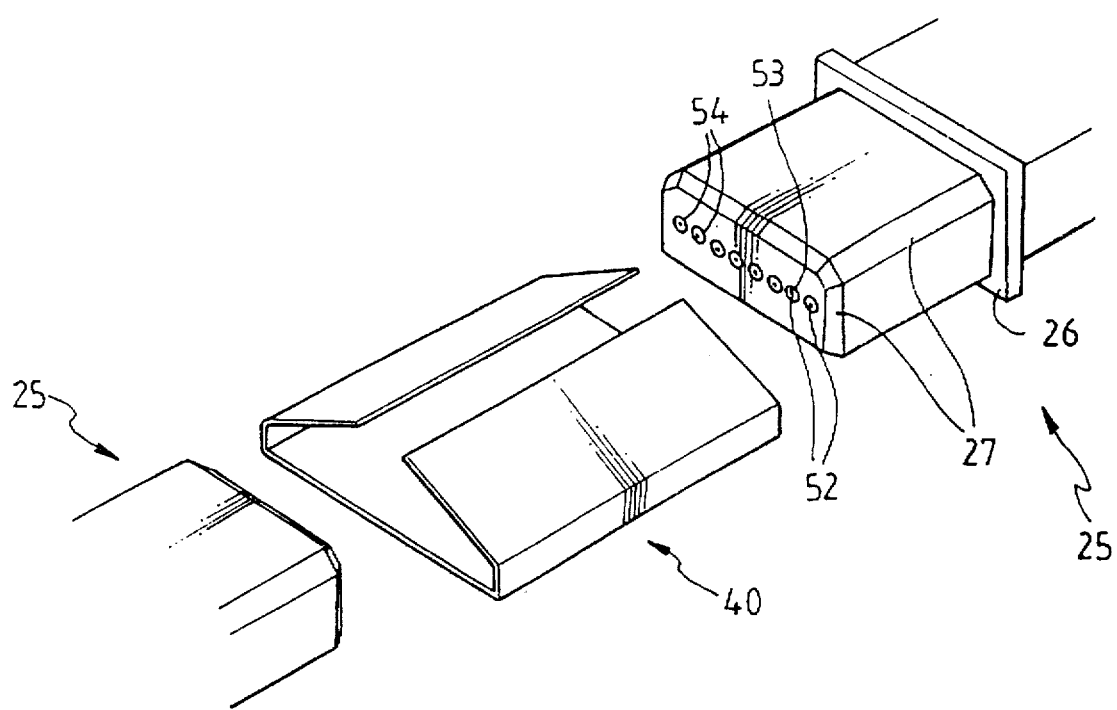
FIG. 3A is an exploded perspective view illustrating a multifiber optical connector according to the present invention in which a ferrule is inserted into a sleeve for arranging the ferrule in cooperation with the sleeve.
Figure 3B:
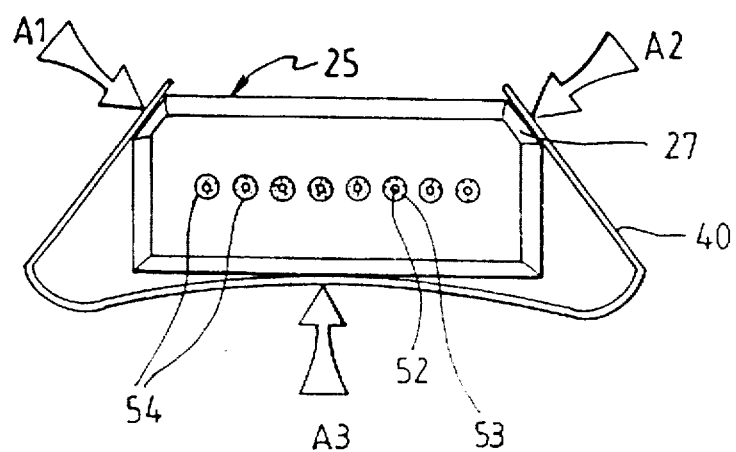
FIG. 3B is a cross-sectional view illustrating a multifiber optical connector according to the present invention in which a ferrule is inserted into a sleeve.

FIG. 3A is an exploded perspective view illustrating a multifiber optical connector according to the present invention in which a ferrule 25 is inserted into a sleeve 40 for arranging the ferrule 25 in cooperation with the sleeve 40, and FIG. 3B is a cross-sectional view illustrating a multifiber optical connector according to the present invention in which a ferrule 25 is inserted into a sleeve 40.

As shown therein, a plurality of small holes 54 are formed in the center portion of the ferrule 25 so as to support the optical fiber core 52. The small holes 54 are aligned in one line.

The sleeve 40 may be made of various materials having a predetermined elastic force. In addition, it preferably has a triangle shaped cross-section when looking from the upper portion thereof. For a better alignment of the ferrule 25, the sleeve 40 must have a good straight advancing characteristic. This sleeve 40 may be made by a press molding method.

As shown in FIGS. 1, 3A and 3B, a ribbon type optical cable 50 is uncoated, and is arranged in the plug 20, and is inserted into the ferrule 25 having a plurality of small holes 54 formed to have a predetermined pitch and diameter below a micron, so that the optical signal being transmitted to the optical fiber core 52 can be transmitted at a lower transmission loss. Such lower transmission loss is controlled by the alignment of the ferrule 25 with respect to forces $A_1, A_2, A_3$ indicated by an arrows which forces are applied to three contact surfaces between the sleeve 40 and the ferrule 25. The ferrule 25, which was surface-polished, is inserted into the sleeve 40 disposed in the adapter 10.

As shown in FIGS. 3A and 3B, the core 52 of the uncoated optical cable 50 of the coating member 51 is inserted into the plurality of the small holes 54, respectively, formed in the ferrule 25, and is fixed by an adhesive 53 which fills the space between the small holes 54 and the core 52.

In a view of the contact between the ferrules 25, the alignment is manually performed in cooperation with a guide section of the ferrule 25 in the sleeve 40 of the adapter 10. Here, in order to reduce the reflection loss which occurs during contacts between the ferrules 25, the cross section of the ferrule 25 is made inclined. And, in order to reduce the polishing time, one end of the ferrule 25 is processed by a chamfer method so that the alignment of the ferrules 25 can be more easily performed in cooperation with the forces $A_1$, $A_2, A_3$ applied to the three contact surfaces when inserting into the sleeve 40.

The lower transmission loss between the optical fibers at the cross sections of the ferrules 25 which are contacted in the sleeve 40 inserted in the adapter 10 is obtained by a direct contact so that a gap can not exist. In more detail, the above is performed by forming a protrusion 26 in the central portion of the ferrule 25 and a clamp spring 28 for generating a predetermined elastic force and supported by the end of the protrusion 26 as shown in FIG. 1.

Generally, when transmitting an optical signal in a single mode, in order to lower the transmission loss, the ferrule 25 must be processed so that a predetermined accuracy below a micron can be maintained. In addition, the temperature range of use of the optical connector should be about 100° C., and the thermal expansion coefficient with respect to the ferrule 25 must be controlled so as to maintain a predetermined dimensional accuracy of the ferrule 25. Namely, the absolute variation amount requires the thermal expansion coefficient of the ferrule 25 to be below $10^{-5}$ per degree C. so that the structure having 1 mm size is deformed below a micron based on the temperature variation of 100° C. To meet the above-described conditions, the ferrule 25 is fabricated as follows.

First, in a view of the productivity of the ferrule 25, a high molecular weight material is preferably used. The fabrication of the ferrule 25 using the high molecular weight material is performed by an accurate molding method. This high molecular weight material has a lower viscosity, and a better size adjustability. An epoxy resin has the above-described characteristics. However, the epoxy resin cannot satisfy the predetermined dimensional accuracy for the optical fiber connector. Namely, a reinforced material is additionally required to provide compensation. There are many kinds of reinforced materials. Among many reinforced materials, a carbon fiber is the best in view of the thermal expansion coefficient. Since carbon fiber has a negative thermal expansion coefficient in the axial direction, the carbon fiber has a lower thermal expansion coefficient than the epoxy resin in cooperation with the epoxy resin.

Here, in view of a modeling characteristic, the carbon fiber must possibly have a shorter length. If the length of the carbon fiber is too short, the reinforcing effect is reduced. The increase in the reinforced material degrades the modeling characteristic. In addition, it is impossible to accurately model the ferrule 25 due to the increased flowing characteristic.

In view of the above-described characteristics, as a result of the study on the fabrication of the ferrule 25, the optimum length of the carbon fiber was 0.7 through 0.9 mm which satisfies the above-described characteristics. In addition, when the amount of the reinforced material is 25 through 45 eight percentage with respect to the entire weight of the material, a viscosity similar to that of the epoxy resin was obtained. Based on the above description, a high molecular weight material was fabricated, and the ferrule 25 was fabricated by a low pressure transfer modeling technique. In this case, it was possible to obtain a desired pitch of 250 μm of the small hole 54 into which the optical fiber core 52 is inserted. Moreover, it is possible to obtain a thermal expansion coefficient of $10^{-6}$ per degree C. which was significantly reduced compared to the conventional art. Furthermore, it was possible to obtain a desired accuracy of the ferrule 25 without a post processing in cooperation with the accuracy of the modeling.

Referring to FIG. 1, the assembling and separation operations of the plug 20 and the adapter 10 of the multifiber optical connector according to the present invention will now be explained.

Assembling steps

When coupling the plug 20 to the adapter 10, an engaging portion 23 of the plug housing 21 is smoothly inserted into the adapter housing in cooperation with the inclined surface of the engaging jaw portion 24 of the engaging portion 23. The plug housing 21 inserted into the interior of the adapter housing to a predetermined depth up to the engaging hole 23 of the adapter housing. The engaging jaw portion 24 formed in the engaging portion 23 of the plug housing 21 elastically engages the engaging hole 11 of the adapter housing. Thereafter, since the engaging portion 23 of the plug housing has a predetermined elastic force, it is possible to maintain a more stable and tighter engagement between the plug 20 and the adapter 10.

Separation Steps

The separation of the plug 20 and the adapter 10 is performed by pulling back the protruding portion 22 formed in the upper and lower portions of the plug housing 21. When pulling back the protruding portion 22, the engaging jaw portion 24 of the engaging portion 23 slidably and downwardly moves in cooperation with the inclined portion of the plug contacting with the engaging portion 23. Therefore, the plug 20 and the adapter 10 are completely separated from each other. The separation of the plug 20 is performed by rearwardly pulling the plug 20. The separation thereof is not performed by the optical cable member 30 and the optical cable 50.

As described above, the invention is directed to a multifiber optical connector which is used in an optical communication system, a cable used with a new alignment method of the optical cable, the structure of an optical connector, and the material of the ferrule.

In addition, the multifiber optical connector according to the present invention is directed to decreasing the dependency on a highly accurate molding technique, thereby reducing the fabrication cost.

Moreover, the multifiber optical connector according to the present invention is adaptable to an optical communication network.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In a multifiber optical connector for connecting an optical cable and at least one optical transmitter, the improvement comprising:

an adaptor including openings, a pass-through hole and engaging holes;

a plug, which engages the openings including a through hole, into which optical fibers are inserted, formed in a central portion of the plug, an engaging portion having an engaging jaw portion for connecting the plug to the adapter and formed at one end of the plug, a plug housing for receiving a body of the plug;

a ferrule, which is disposed in one end of the plug, having a plurality of holes into which a core of the optical fibers are inserted to provide protection and alignment;

an optical fiber alignment device, inserted into the pass through hole for surrounding an outer portion of the ferrule disposed at one end of the plug inserted into the adapter and for applying forces to the ferrule to align the optical fibers inserted into the ferrule; and an optical cable protector surrounding an outer portion of the optical cable connected to the plug for protecting against breakage of the optical cable.

2. The connector of claim 1, wherein the optical fiber alignment device is a sleeve having a triangular shaped cross section for providing an alignment of the ferrule by the forces caused by contact of the sleeve with three surfaces of the ferrule, with a portion of the sleeve being open along the ferrule.

3. The connector of claim 2, further comprising a cutaway portion formed at corners of the ferrule to align the ferrule in cooperation with the forces applied to the three contact surfaces when the ferrule is inserted into the sleeve.

4. The connector of claim 1, wherein a cross section of the ferrule is polished with an inclined polishing process to reduce a reflection loss between ferrules, and corners of an end of the ferrule are cut-away to reduce surface area.

5. The connector of claim 1, further comprising a protruding portion formed in a central portion of the ferrule, and a clamp spring disposed in a rear portion of the protruding portion for generating a predetermined elastic force.

6. The connector of claim 1, wherein the ferrule is made of a combination of an epoxy resin and a carbon fiber.

7. The connector of claim 6, wherein an amount of carbon fiber added to the epoxy resin is between 25 to 35 percent by weight.

8. The connector of claim 6, wherein a length of the carbon filter is between 0.7 and 0.9 mm.

* * * * *